(12) United States Patent
Huang et al.

(10) Patent No.: US 12,051,309 B2
(45) Date of Patent: Jul. 30, 2024

(54) DFOS SELF-ANOMALY DETECTION SYSTEM FOR SAFER INFRASTRUCTURES

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 333 days.

(21) Appl. No.: 17/579,511

(22) Filed: Jan. 19, 2022

(65) Prior Publication Data
US 2022/0228948 A1 Jul. 21, 2022

Related U.S. Application Data

(60) Provisional application No. 63/139,385, filed on Jan. 20, 2021.

(51) Int. Cl.
*G08B 13/186* (2006.01)
*G01M 11/00* (2006.01)
*G02B 6/35* (2006.01)
*G08B 13/08* (2006.01)
*H04B 10/071* (2013.01)

(52) U.S. Cl.
CPC ........... *G08B 13/186* (2013.01); *G01M 11/31* (2013.01); *G02B 6/3572* (2013.01); *G08B 13/08* (2013.01); *H04B 10/071* (2013.01)

(58) Field of Classification Search
CPC .............. G08B 13/08; G08B 13/186; G01D 5/35354–35367; G01M 11/31–3154; H04B 10/071; G02B 6/3572
See application file for complete search history.

(56) References Cited

U.S. PATENT DOCUMENTS

| | | | | |
|---|---|---|---|---|
| 4,189,206 A | * | 2/1980 | Terai | G02B 6/3502 385/23 |
| 4,204,744 A | * | 5/1980 | Wittmann | G02B 6/3502 385/22 |
| 4,239,331 A | * | 12/1980 | Aoyama | G02B 6/3524 385/33 |
| 4,577,184 A | * | 3/1986 | Hodara | G08B 29/16 340/600 |
| 6,002,501 A | * | 12/1999 | Smith | G01M 3/28 356/73.1 |
| 7,466,890 B2 | * | 12/2008 | Kachmar | G08B 13/08 385/16 |
| 9,182,253 B2 | * | 11/2015 | Courchaine | G02B 6/3897 |

(Continued)

FOREIGN PATENT DOCUMENTS

DE   245962 A1 * 5/1987
EP   2819320 A1 * 12/2014

(Continued)

OTHER PUBLICATIONS

Written opinion and search report for PCT/US2022/013065, dated May 4, 2022. (Year: 2022).*

*Primary Examiner* — Michael Stahl
(74) *Attorney, Agent, or Firm* — Joseph Kolodka

(57) ABSTRACT

Aspects of the present disclosure describe distributed fiber optic sensing (DFOS) systems, methods, and structures that advantageously extend DFOS techniques to anomaly detection using optical magnetism switches (OMC) that are integrated into the DFOS system.

1 Claim, 10 Drawing Sheets

(56) References Cited

U.S. PATENT DOCUMENTS

| | | | |
|---|---|---|---|
| 9,544,049 B2 * | 1/2017 | Fink ................... | H04Q 11/0067 |
| 2006/0071770 A1 * | 4/2006 | Giotto ................ | G08B 13/1481 |
| | | | 340/500 |
| 2009/0040046 A1 * | 2/2009 | Browning, Jr. ........ | G08B 13/08 |
| | | | 340/552 |
| 2016/0098913 A1 * | 4/2016 | Vastmans ............... | G08B 13/08 |
| | | | 356/73.1 |
| 2019/0056607 A1 * | 2/2019 | Ferguson .............. | G02F 1/0134 |

FOREIGN PATENT DOCUMENTS

| | | | |
|---|---|---|---|
| EP | 2549317 B1 | * | 4/2015 |
| JP | 2010-122761 A | * | 6/2010 |

* cited by examiner

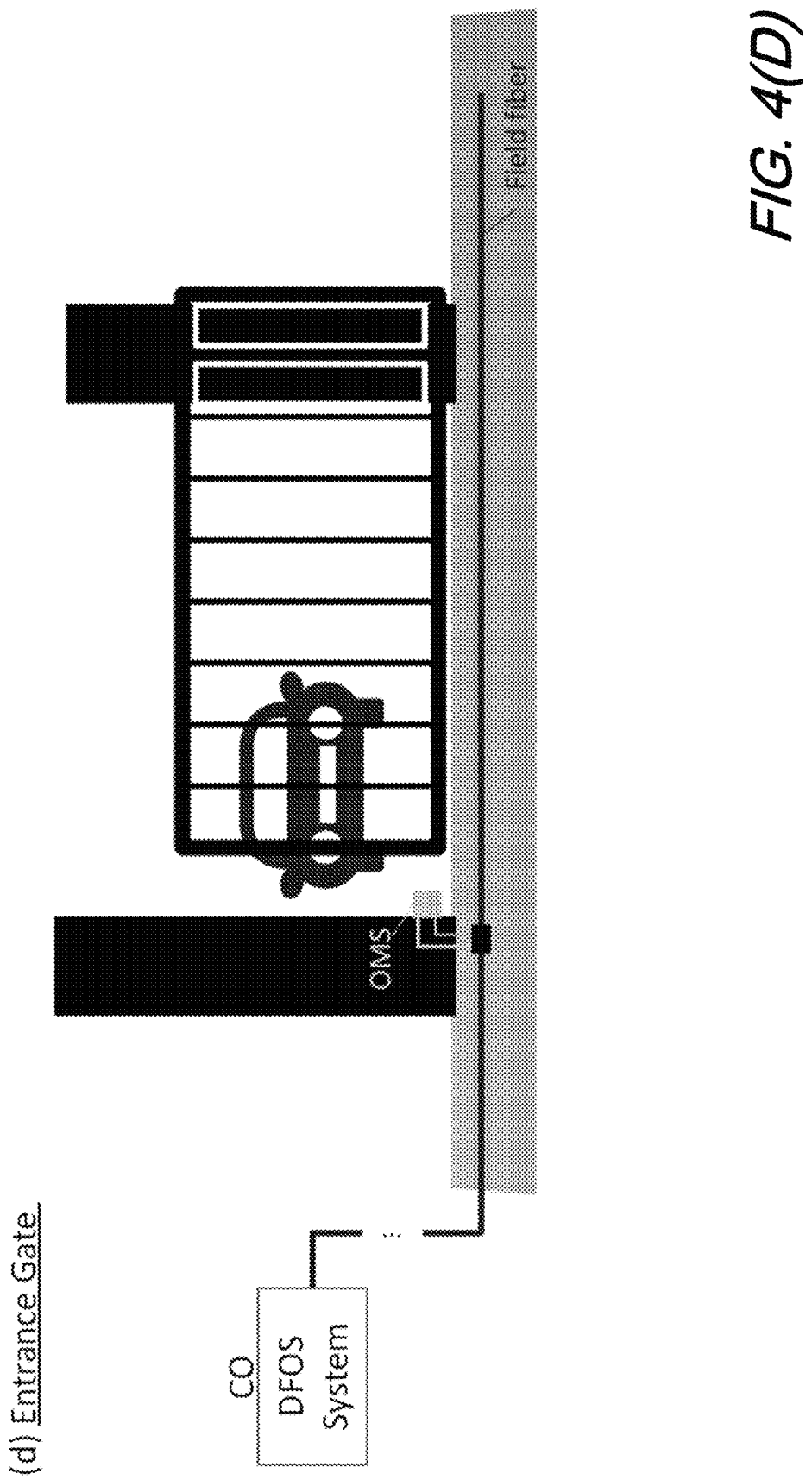

DFOS SELF-ANOMALY DETECTION SYSTEM FOR SAFER INFRASTRUCTURES

CROSS REFERENCE TO RELATED APPLICATIONS

This application claims the benefit of U.S. Provisional Patent Application Ser. No. 63/139,385 filed 20 Jan. 2021 the entire contents of which is incorporated by reference as if set forth at length herein.

TECHNICAL FIELD

This disclosure relates generally to distributed fiber optic sensing (DFOS). More particularly, it pertains to the detection/determination of anomalies that may be indicative of intrusions to infrastructure.

BACKGROUND

As will be understood by those skilled in the art, distributed optical fiber sensing (DFOS) techniques have been employed in a wide variety of important applications as they can provide sensory data including temperature, vibrations, etc., proximate to a sensing optical fiber. Given such utility, additional applications for DFOS sensing techniques would represent a welcome addition to the art.

SUMMARY

An advance in the art is made according to aspects of the present disclosure directed to DFOS systems, methods, and structures that advantageously extend DFOS techniques to anomaly detection using optical magnetism switches (OMC) that are integrated into the DFOS system.

BRIEF DESCRIPTION OF THE DRAWING

A more complete understanding of the present disclosure may be realized by reference to the accompanying drawing in which:

FIG. 2(A) and FIG. 2(B) are schematic diagrams illustrating optical magnetism switches (OMS) integrated into a DFOS system in which: FIG. 2(A) shows a 1×1 OMS; and FIG. 2(B) shows a 1×2 OMS according to aspects of the present disclosure;

FIG. 3(A) and FIG. 3(B) are schematic diagrams illustrating a self-anomaly detection system in which optical magnetism switches (OMS) are integrated into a DFOS system in which: FIG. 3(A) shows a normal operation; and FIG. 3(B) shows an anomalous event triggered by the OMS according to aspects of the present disclosure;

FIG. 4(A), FIG. 4(B), FIG. 4(C), and FIG. 4(D) schematically illustrate various components that may be employed in a DFOS system employing optical magnetism switches according to aspects of the present disclosure in which: FIG. 4(A) illustrates a fiber distributed hub; FIG. 4(B) illustrates OMS on doors on remote terminal; FIG. 4(C) illustrates OMS on cabinets inside a data center; and FIG. 4(D) illustrates OMS on an entrance gate, all according to aspects of the present disclosure.

Figure 1:
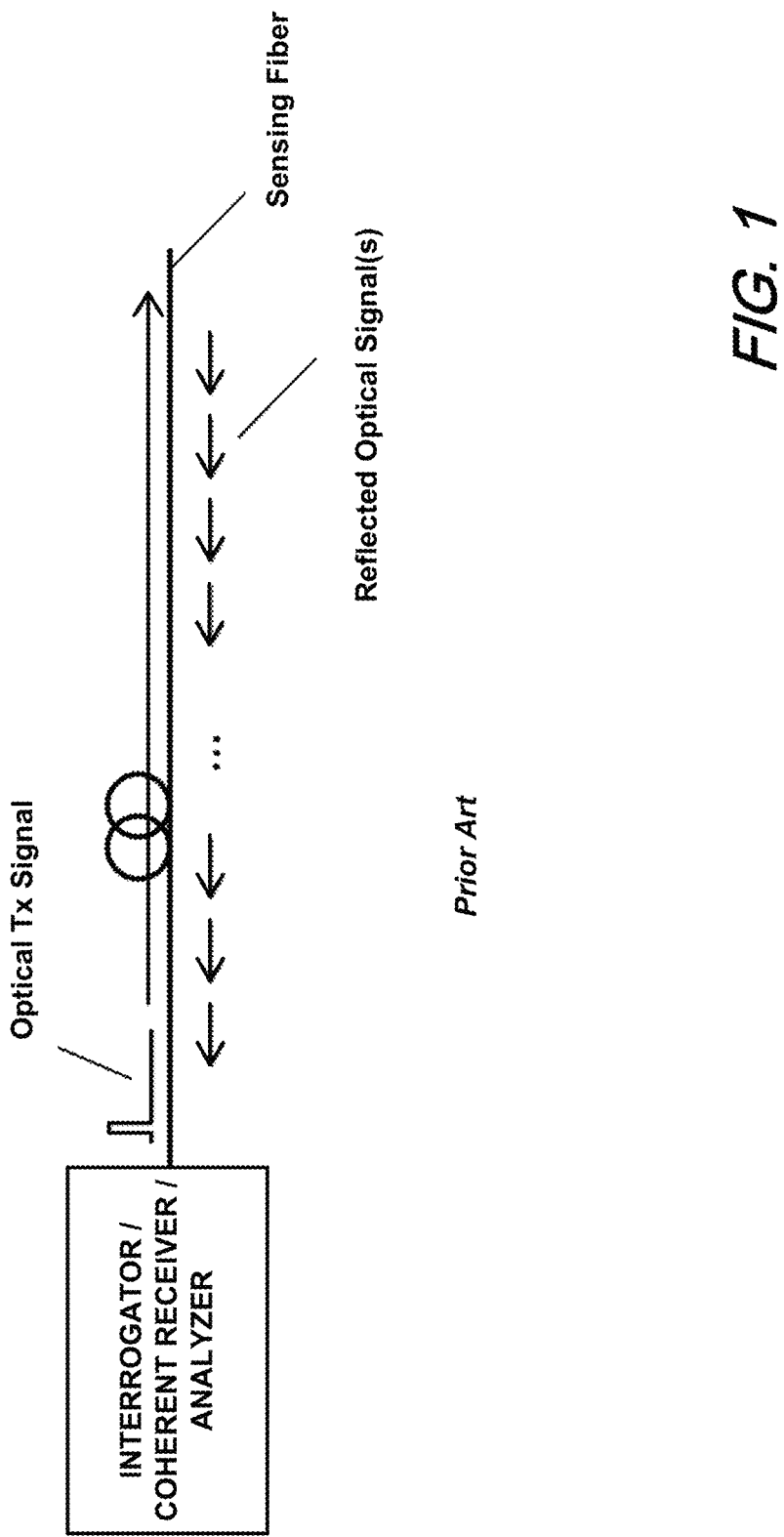
FIG. 1 is a schematic diagram of an illustrative DFOS arrangement as is known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Figure 2A:
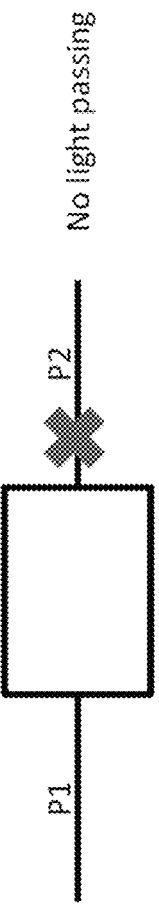
Figure 2A:
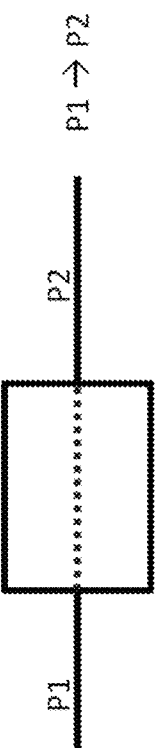
Figure 2A:
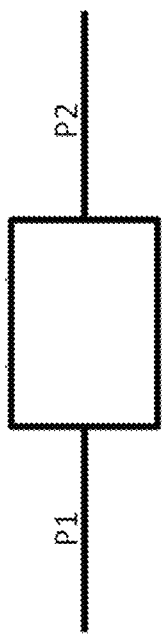
Figure 2B:
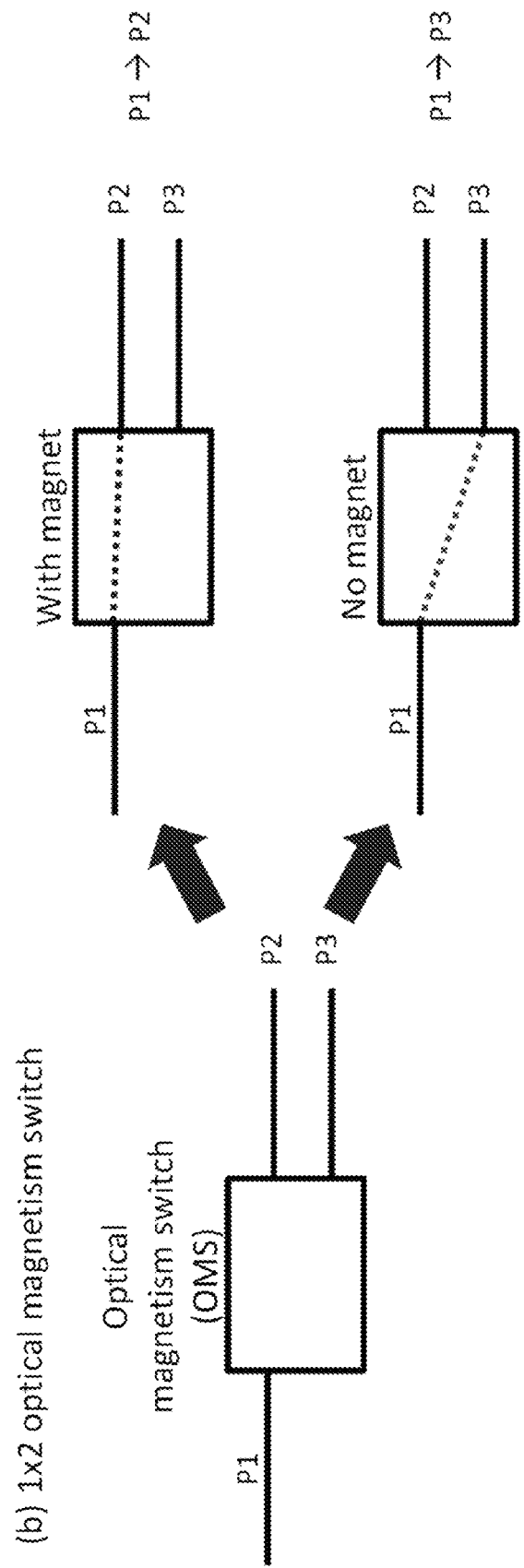

FIG. 2(A) and FIG. 2(B) are schematic diagrams illustrating optical magnetism switches (OMS) integrated into a DFOS system in which: FIG. 2(A) shows a 1×1 OMS; and FIG. 2(B) shows a 1×2 OMS according to aspects of the present disclosure;

With reference to these figures, we first note that an OMS is generally a small, passive, low-cost optical device which turns light on and off or change light paths by the moment of a magnet. For a 1×1 OMS, FIG. 2(A), light is illustrated as passing from P1 to P2 with magnet while no light passes without magnet. For a 1×2 OMS, FIG. 2(B), the signal is shown passing from P1 to P2 with magnet; otherwise, it passes from P1 to P3 without (no) magnet.

Figure 3A:
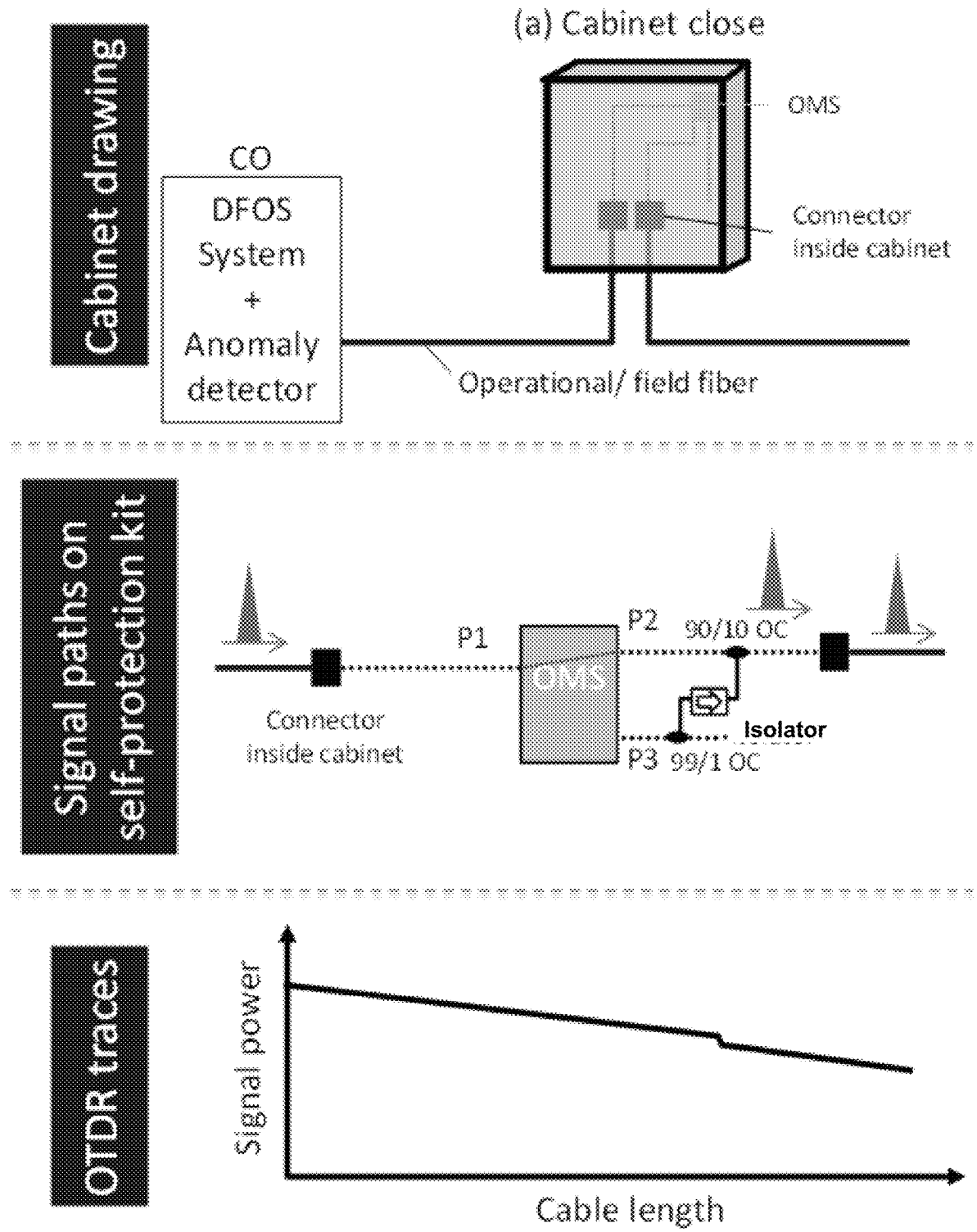
Figure 3B:
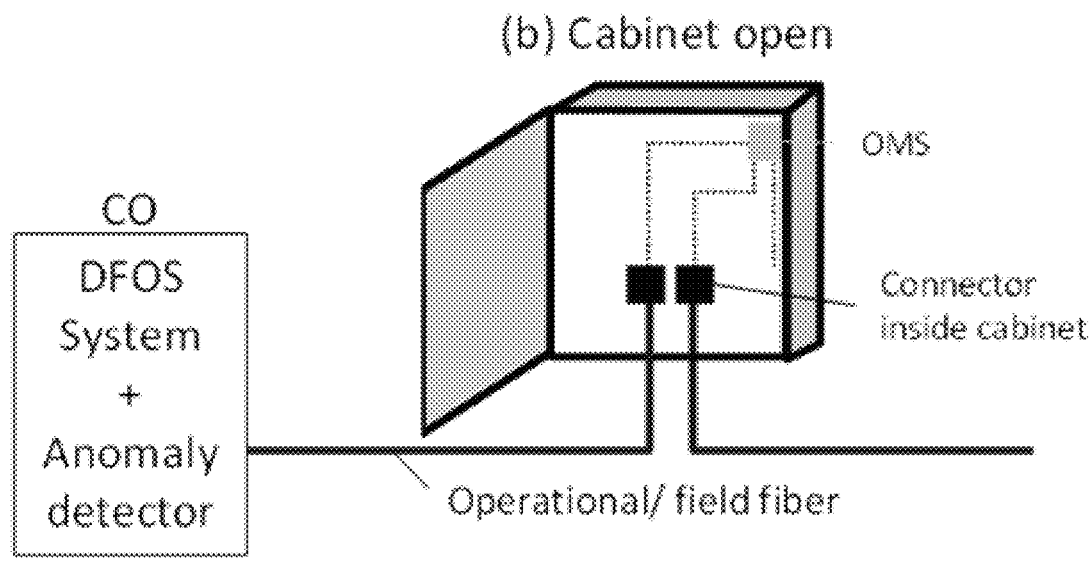
Figure 3B:
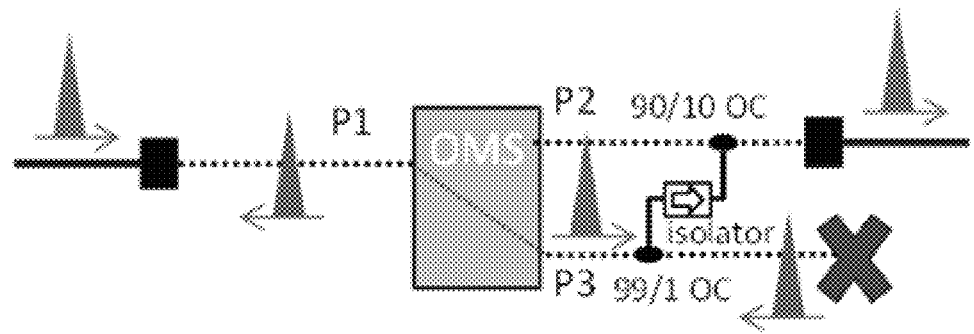
Figure 3B:
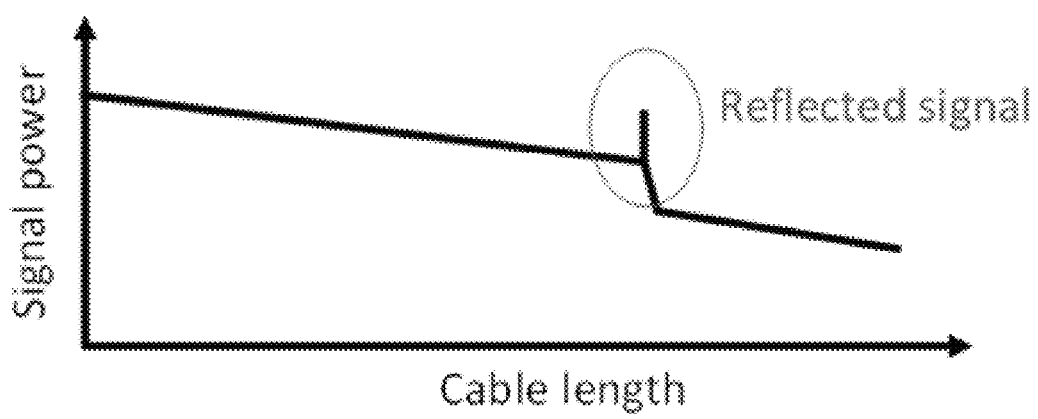

FIG. 3(A) and FIG. 3(B) are schematic diagrams illustrating a self-anomaly detection system in which optical magnetism switches (OMS) are integrated into a DFOS system in which: FIG. 3(A) shows a normal operation; and FIG. 3(B) shows an anomalous event triggered by the OMS according to aspects of the present disclosure.

With reference to these figures, there it shows the configuration of sensing layer overlaid on an existing, deployed optical communications network that may be conveying live telecommunications or other traffic. The distributed fiber optic sensing (DFOS) system and anomaly detector is shown located in a centralized control office (CO) and may include a remote terminal for remote monitoring of an entire fiber optic cable route.

The DFOS system is optically connected to an in-field, optical sensing fiber to provide remote sensing functions. We note again that such optical sensing fiber may be dark, or an operational, telecommunications carrying optical fiber provided by communications service providers.

As illustrated in the figures, FIG. 3(A) and FIG. 3(B) show respectively the detection of cabinet door closed and cabinet door open situations. To provide a protective anomaly detection, a self-protection kit including one or more OMS, an optical isolator, a 90/10 optical coupler (OC) and a 99/1 OC. As will be appreciated, the OMS is a small passive device which can be mounted inside a cabinet, and provide an optical switching operation—such as that previously described—upon the occurrence of an open/closed condition. As illustratively shown, two ports (P1 and P3) are connected to input and output connectors of the cabinet, respectively.

In a particular configuration, when the cabinet door is closed, it is in the magnet state as previously described. The sensing (interrogating) signal will travel from port P1 to P2 and on to another further section of the in-field sensing optical fiber. From an optical time domain reflectometry (OTDR) trace, it can be seen that there are no substantial reflected signals returned (scattered) from this switch location. In the situation where the cabinet is open, the magnet (magnetic effect on the switch) is removed once the cabinet door is opened, and the switch is activated and the two sides separated. The interrogating sensing signal will then travel from P1 to P3. By passing through the 99/1 OC on P3 port and 10/90 OC on P2 port, interrogating sensing signals (99%) are directed to the sensing fiber while a remaining 1% of the interrogating sensing signals are "dead ended".

Without any terminators, substantially 4% of the light will be reflected in open-ended scenarios. Hence, it can be observed as a large, reflected/scattered signal exhibiting large losses from OTDR traces. The anomaly detector located within the central office will identify these reflected signals and initiate an alarm sequence that may include notifying an operator that a door is open.

Figure 4A:
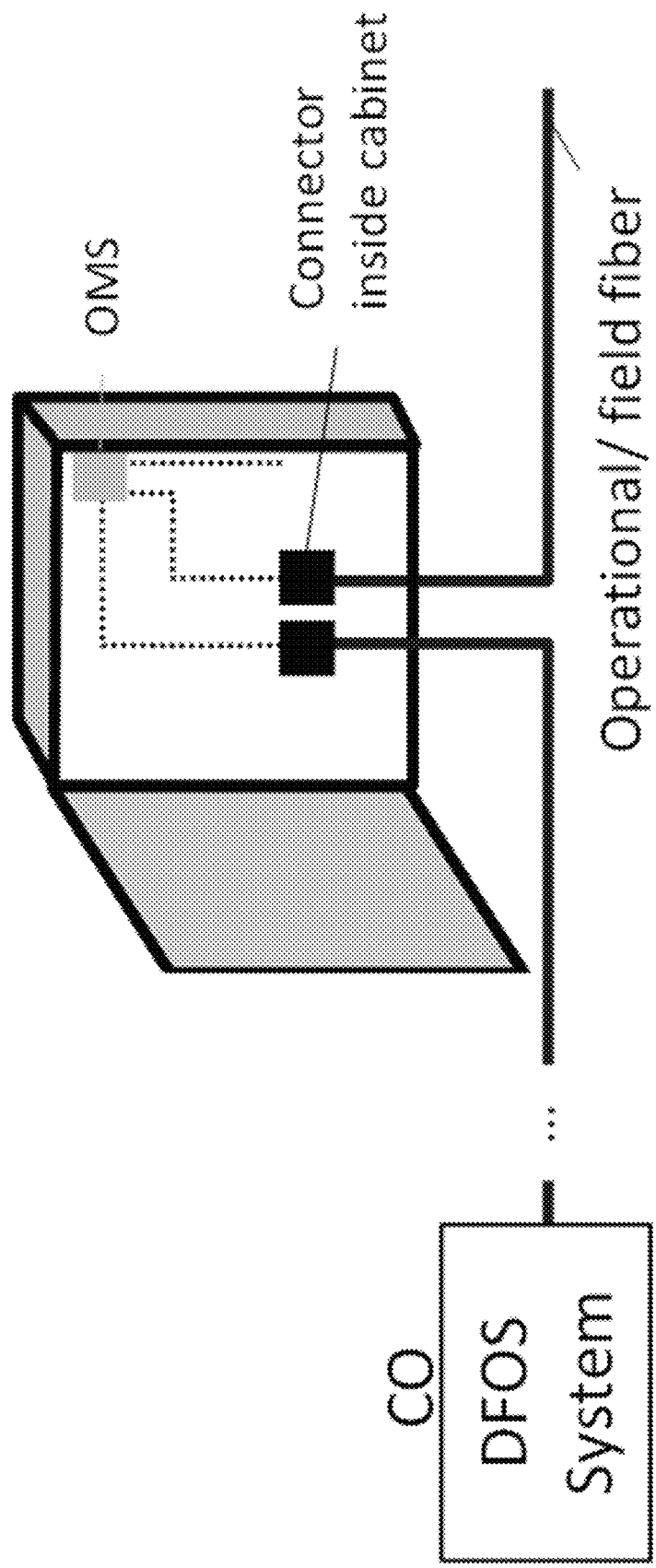
Figure 4B:
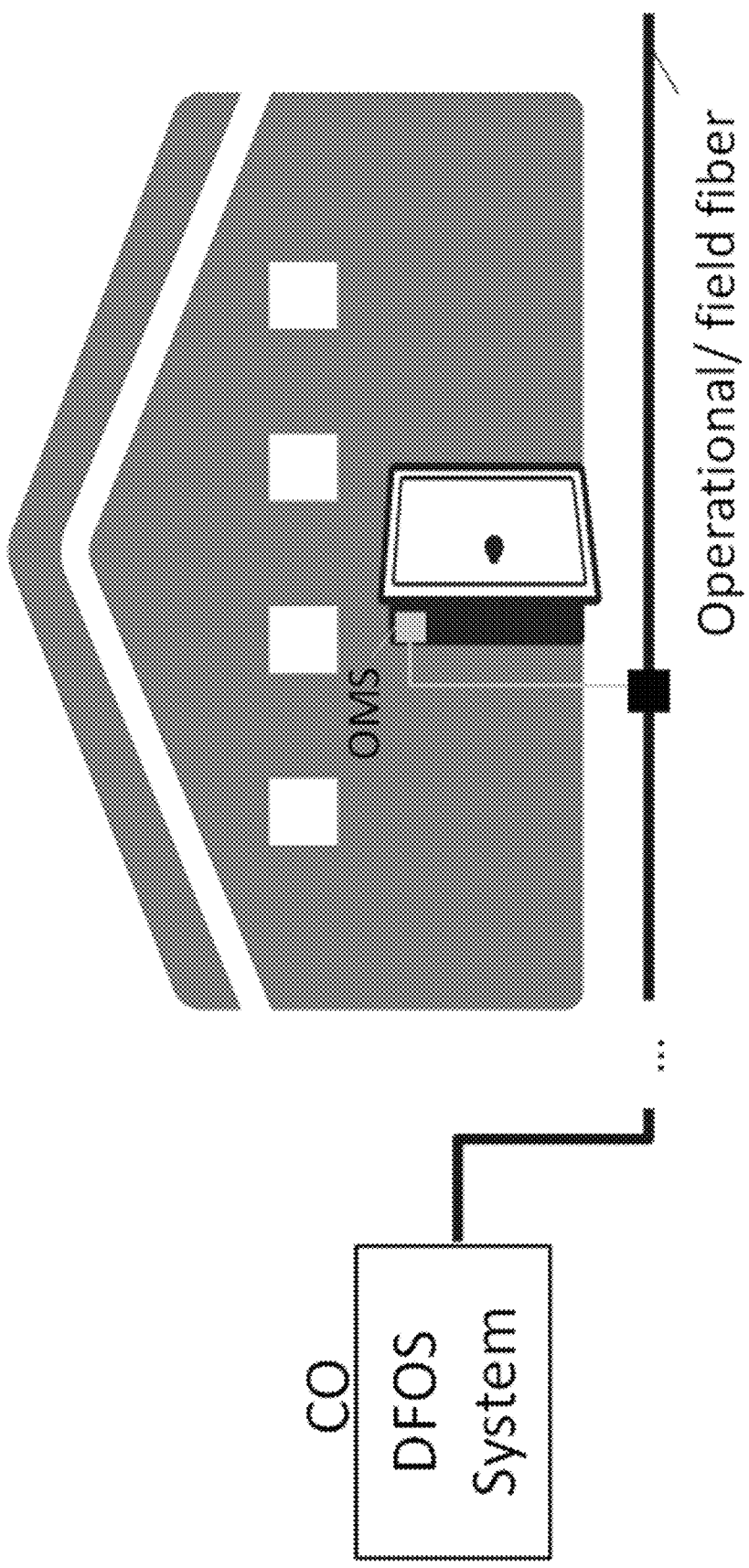
Figure 4C:
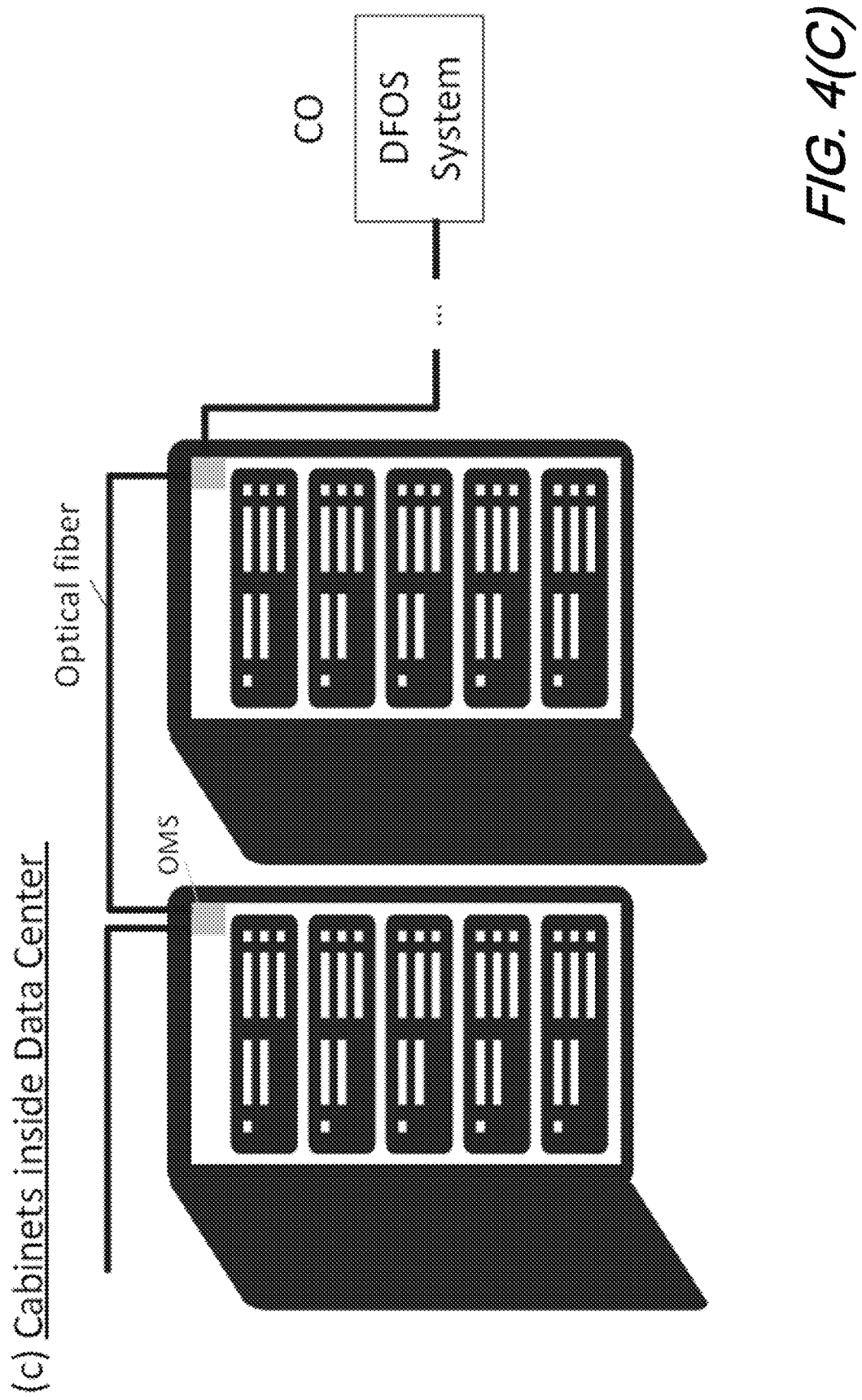

FIG. 4(A), FIG. 4(B), FIG. 4(C), and FIG. 4(D) schematically illustrate various use cases and components that may be employed in a DFOS system employing optical magnetism switches according to aspects of the present disclosure in which: FIG. 4(A) illustrates a fiber distributed hub; FIG. 4(B) illustrates OMS on doors on remote terminal; FIG. 4(C) illustrates OMS on cabinets inside a data center; and FIG. 4(D) illustrates OMS on an entrance gate, all according to aspects of the present disclosure.

Fiber Distributed Hubs

As will be understood and appreciated by those skilled in the art, there are millions of fiber distribution hubs in carrier's networks from distribution fibers to drop fibers. Most are hidden inside bushes, under trees or mounted on poles without electricity. To use surveillance cameras a technician in-person check of the facilities are not an efficient way to inspect/protect the hubs. Hence, our self-anomaly detection system provides a solution to monitor entire hubs along the fiber route automatically Doors on Remote Terminal For distributed fiber routes in carrier networks, there are deployed remote terminals every tens of miles. Typically, no technicians visit/inspect such remote terminals unless any necessary maintenance/repair is determined/required. Hence, self-anomaly detection is needed to ensure a safe facility. If the remote terminal and fiber distributed hubs are in the same fiber route, one DFOS system with anomaly detector according to aspects of the present disclosure can advantageously monitor entire points of interested at the same time. Not only for a remote terminal, our disclosure is suitable for every location such as storage, warehouses, stadiums, etc.

Cabinet Inside Data Centers

To detect cabinets as open or closed is always a challenge in a data center, since servers that are oftentimes contained in such cabinets are important facilities that need a highest level of security. One current approach is to employ a large number of strategically placed surveillance cameras for monitoring. Unfortunately, such arrangements are expensive and still require maintenance and inspection while not providing complete coverage of desired surveillance areas. By using our disclosed arrangement and accompanying method, one DFOS system can monitor all of the cabinets inside a Data Center for a remote, electricity-free, maintenance-free, no dead zone solution.

Entrance Gates

Similar to the problems and approaches for data centers, entrance gates—particularly in slightly used and/or remote areas—pose a difficult surveillance challenge. Fortunately, our disclosed arrangements and methods provide an efficient, solution to entrance gate monitoring that can advantageously be integrated with existing optical fiber installations.

Figure 5:
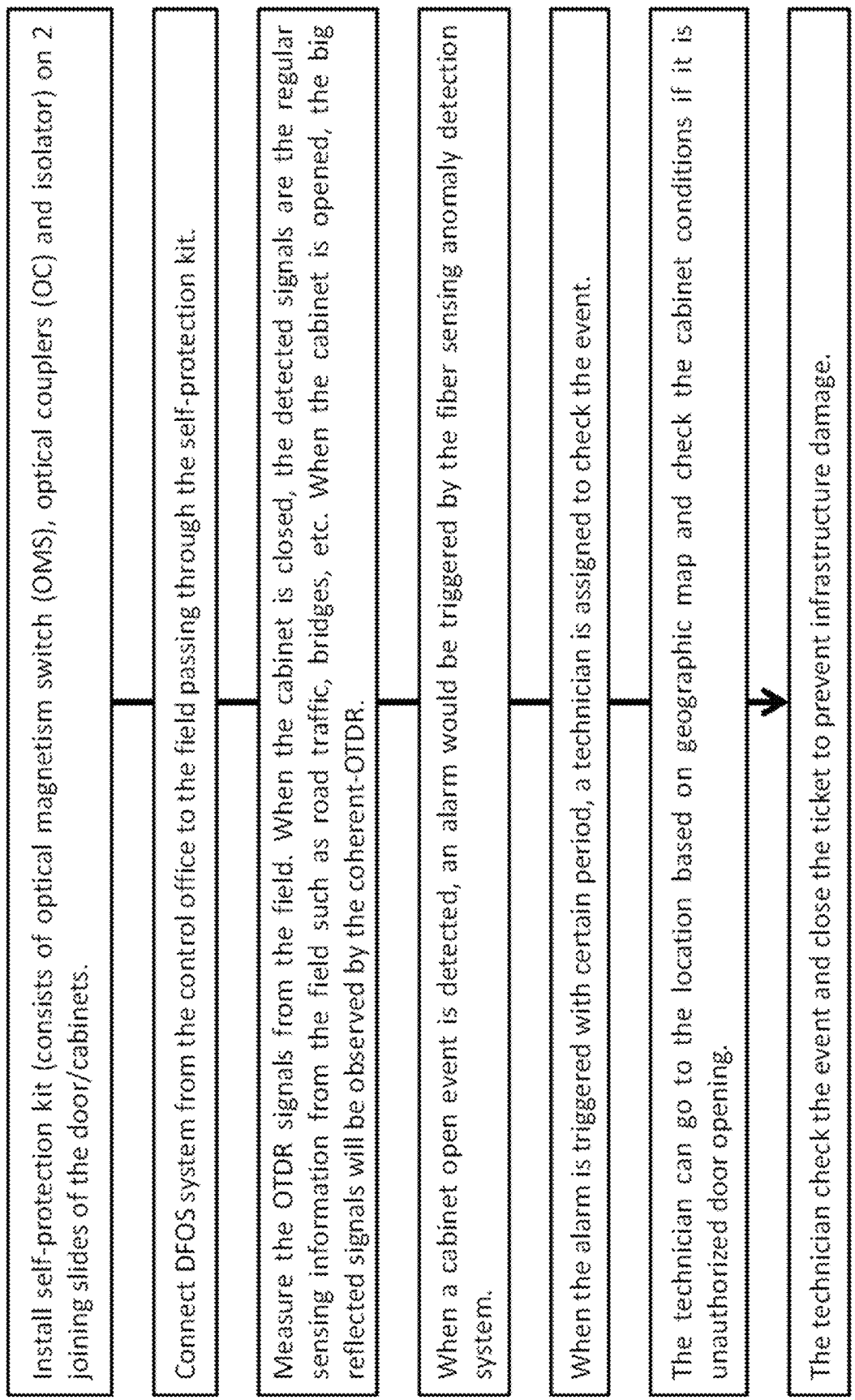
FIG. 5 is a flow diagram illustrating an overall process for anomaly detection using DFOS with OMS according to aspects of the present disclosure.

FIG. 5 is a flow diagram illustrating an overall process for anomaly detection using DFOS with OMS according to aspects of the present disclosure. As illustratively shown in that flow diagram, an existing optical telecommunications network or existing DFOS sensory fiber installation may be retrofitted by installing a self-protection kit including OMS (s), optical coupler(s), isolator(s), on appropriate sides of doors/cabinets/gates/etc. such that the magnetism switch indicates operating of a door or other element.

Next, the DFOS is activated and interrogates the sensor fiber. Measuring, at a pre-determined or another interval, OTDR signals from the sensor fiber to detect any magnetism switch activations. When so detected, activate any alarms and notify any appropriate personnel. In the situation where personnel are notified, maintenance and/or security personnel may be deployed to investigate/cure the detected condition.

At this point, while we have presented this disclosure using some specific examples, those skilled in the art will recognize that our teachings are not so limited. Accordingly, this disclosure should be only limited by the scope of the claims attached hereto.

The invention claimed is:

1. A distributed fiber optic sensing (DFOS) system with self-anomaly detection comprising:

a length of optical sensing fiber;

a DFOS interrogator/analyzer in optical communication with the length of optical sensing fiber, said DFOS interrogator/analyzer configured to generate interrogation pulses, inject the generated interrogation pulses into the optical sensing fiber, detect/analyze reflected/backscattered signals from the optical sensing fiber to determine and output environmental conditions encountered along the length of optical sensing fiber; and one or more optical magnetism switches (OMS) in optical communication with and disposed along the length of optical sensing fiber, said magnetism switches configured to alter light path(s) in the optical sensing fiber in response to a mechanical condition experienced by the magnetism switch such that it is detected/analyzed by the DFOS interrogator/analyzer;

wherein the one or more OMS affect the light path(s) by the moment of a magnet included in the one or more OMS;

wherein the one or more OMS are 1×2 switches with three ports configured such that 2 of the ports are directly connected to the optical sensing fiber and the third port is connected to the optical sensing fiber via an optical isolator.

* * * * *